(12) United States Patent
Pialot et al.

(10) Patent No.: US 11,602,913 B2
(45) Date of Patent: Mar. 14, 2023

(54) METHOD FOR MANUFACTURING AN IMPROVED PNEUMATIC TIRE

(71) Applicant: Compagnie Generale Des Etablissements Michelin, Clermont-Ferrand (FR)

(72) Inventors: Frederic Pialot, Clermont-Ferrand (FR); Thomas Fabre, Clermont-Ferrand (FR); Pierre Wiel, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 401 days.

(21) Appl. No.: 16/630,213

(22) PCT Filed: Jul. 2, 2018

(86) PCT No.: PCT/FR2018/051634
§ 371 (c)(1),
(2) Date: Jan. 10, 2020

(87) PCT Pub. No.: WO2019/012201
PCT Pub. Date: Jan. 17, 2019

(65) Prior Publication Data
US 2020/0130309 A1    Apr. 30, 2020

(30) Foreign Application Priority Data

Jul. 11, 2017  (FR) ...................................... 1756540

(51) Int. Cl.
*B29D 30/52*   (2006.01)
*B29D 30/06*   (2006.01)

(52) U.S. Cl.
CPC ......... *B29D 30/52* (2013.01); *B29D 30/0678* (2013.01)

(58) Field of Classification Search
CPC ............ B29D 30/0601; B29D 30/0605; B29D 30/0606; B29D 30/0643; B29D 30/0645;
(Continued)

(56) References Cited

U.S. PATENT DOCUMENTS 3,457,594 A * 7/1969 Baudou ............... B29C 45/2681
425/582
3,891,740 A * 6/1975 Vannan, Jr. ........ B29D 30/0678
264/263
(Continued)

FOREIGN PATENT DOCUMENTS

DE   2658374 A1   6/1978
EP   2554362 A1   2/2013
(Continued)

OTHER PUBLICATIONS

"Élastomères thermoplastiques [Thermoplastic elastomers] (TPE)", Michel Biron, Techniques de l'ingénieur, Jul. 10, 2000.

*Primary Examiner* — Robert C Dye
*Assistant Examiner* — Sedef E Paquette
(74) *Attorney, Agent, or Firm* — Dickinson Wright PLLC; Steven C. Hurles

(57) ABSTRACT

The method includes the step of forming a carcass from at least one first material based on a thermoplastic elastomer. The method continues with the step of forming, on the carcass, at least bead zone from at least one second material based on a thermoplastic elastomer to form an assembly. The method proceeds with the step of forming, on the assembly an additional part from at least one third material based on a thermoplastic elastomer.

8 Claims, 4 Drawing Sheets

(58) Field of Classification Search
CPC .. B29D 30/065; B29D 30/0678; B29D 30/52; B29D 30/62; B29D 2030/063; B29D 2030/084; B29C 45/00
USPC .................................. 156/110.1, 130.5, 125
See application file for complete search history.

(56) References Cited

U.S. PATENT DOCUMENTS

| | | | | |
|---|---|---|---|---|
| 4,201,744 | A * | 5/1980 | Makinson | B29D 30/06 156/125 |
| 2003/0209309 | A1* | 11/2003 | Steinke | B29C 53/043 156/130.7 |
| 2012/0152428 | A1* | 6/2012 | Kouno | B60C 9/2204 152/526 |
| 2016/0001607 | A1* | 1/2016 | Kon | B60C 15/04 152/524 |

FOREIGN PATENT DOCUMENTS

| | | |
|---|---|---|
| EP | 2620297 A1 | 7/2013 |
| EP | 2625028 A1 | 8/2013 |
| EP | 2965923 A1 | 1/2016 |
| FR | 2391063 A1 | 12/1978 |
| JP | H07329065 A | 12/1995 |
| WO | 0117800 A1 | 3/2001 |

* cited by examiner

METHOD FOR MANUFACTURING AN IMPROVED PNEUMATIC TIRE

CROSS-REFERENCE TO RELATED APPLICATIONS

The present application claims priority to PCT International Patent Application No. PCT/FR2018/051634, filed Jul. 2, 2018, which claims priority to FR 1756540, filed Jul. 11, 2017.

TECHNICAL FIELD OF THE INVENTION

The present disclosure relates to a process for manufacturing a tire and more particularly to such a tire not including any rubber material based on diene elastomer.

BACKGROUND

Tires are usually formed from parts made of rubber materials such as vulcanizable diene elastomers which are assembled. Uncured tires are generally manufactured from drums by following known steps of flat manufacturing on a first building drum and then on a second finishing drum. A final curing step allows the uncured plastic material to become elastic notably by vulcanization. Such a manufacturing process conventionally lasts about 20 minutes for a passenger vehicle tire.

The reason for this is that the curing time is directly influenced by the mass of the tire and thus the type of tire. Thus, for a passenger vehicle tire weighing about 10 kg, the curing time is of the order of 10 minutes, whereas for heavy-duty vehicle tires or civil-engineering vehicle tires weighing from several tens of kilograms to several tons, the curing time ranges from 40 minutes to several days.

For ecological and qualitative reasons, these rubber materials still need to be optimized in order to reduce their rolling resistance and to improve their performance qualities (chemical resistance, mechanical strength, etc.) while at the same time improving their recyclability.

SUMMARY OF THE INVENTION

The aim of the disclosure is to provide a novel process for manufacturing a novel type of tire which makes it possible to significantly modify the cost of implementation of the process, the performance qualities of the tire and also its recyclability.

To this end, the disclosure relates to a process for manufacturing a tire, characterized in that it includes the following steps:
  a) forming a carcass from at least one first material based on thermoplastic elastomer;
  b) forming on the carcass at least one bead zone from at least one second material based on thermoplastic elastomer;
  c) forming, on the assembly obtained during step b), an additional part from at least one third material based on thermoplastic elastomer in order to obtain a tire which comprises a tread formed during step b) or step c) from a material based on thermoplastic elastomer.

Advantageously according to the disclosure, the process involves novel types of materials based on one (or more) thermoplastic elastomer(s) (occasionally referred to as TPE). It is thus understood that these materials used in the manufacture of the tire replace conventional rubber materials. According to the disclosure, the replacement advantageously concerns all of the tire.

Furthermore, advantageously according to the disclosure, the tread is preferably formed by injection, preferentially by overmolding, during step b) or step c), from a material based on thermoplastic elastomer.

The use of these materials based on thermoplastic elastomer makes it possible, in point of fact, to significantly modify the production costs of the tire and also the final performance qualities. By way of example, the rolling resistance, the resistance to external attack (scratching, ozone, oxidation, etc.) may be notably improved when compared with rubber materials. In addition, they are recyclable.

Finally, it is no longer necessary to perform the curing step which may take, for a passenger vehicle tire, between 10 and 15 minutes. It is thus understood that the process is very much shortened when compared with the manufacturing process based on rubber materials.

According to other optional embodiment features of the disclosure:
  Step a) includes the phases a1): manufacturing a carcass ply and two bead wires, a2): injecting, into a carcass mold, the first material based on thermoplastic elastomer while overmolding this first material around the carcass ply and the two bead wires in order to form the carcass, a3): cooling, in the carcass mold, the assembly obtained during step a2), and a4): releasing the carcass thus formed from the carcass mold;
  According to a first variant, step b) includes the phases b1): manufacturing at least one reinforcing ply, b2): injecting, into a bead zone mold, the second material based on thermoplastic elastomer while overmolding this second material on the reinforcing ply so as to form the bead zones and a tread on the carcass, b3): cooling, in the bead zone mold, the assembly obtained during step b2), and b4): releasing the assembly obtained during step b2) from the bead zone mold;
  According to a first variant, step c) includes the phases c1): injecting, into an additional part mold, the third material based on thermoplastic elastomer so as to form exterior sidewalls, c2): cooling, in the additional part mold, the assembly obtained during step c1), and c3): releasing the tire thus formed from the additional part mold;
  According to a second variant, step b) includes the phases b5): injecting, into a bead zone mold, the second material based on thermoplastic elastomer so as to form the bead zones on the carcass, b6): cooling, in the bead zone mold, the assembly obtained during step b5), and b7): releasing the assembly obtained during step b5) from the bead zone mold;
  According to a second variant, step c) includes the phases c4): manufacturing at least one reinforcing ply, c5): injecting, into an additional part mold, the third material based on thermoplastic elastomer while overmolding this third material on the reinforcing ply so as to form exterior sidewalls and a tread, c6): cooling, in the additional part mold, the assembly obtained during step c5), and c7): releasing the tire thus formed from the additional part mold;
  According to a third variant, step b) includes the phases b8): injecting, into a bead zone mold, the second material based on thermoplastic elastomer so as to form the bead zones and exterior sidewalls on the carcass, b9): cooling, in the bead zone mold, the assembly obtained during step b8), and b10): releasing the assembly obtained during step b8) from the bead zone mold;

According to a third variant, step c) includes the phases c4): manufacturing at least one reinforcing ply, c8): injecting, into an additional part mold, the third material based on thermoplastic elastomer while overmolding this third material on the reinforcing ply so as to form a tread, c9): cooling, in the additional part mold, the assembly obtained during step c8), and c10): releasing the tire thus formed from the additional part mold;

Each mold is formed from a frame arranged to receive removable elements dedicated to each step a), b) and c);

Each mold is maintained at a temperature below 35° C. during the implementation of the process;

Each cooling phase allows the rigidification of at least the outer surface of the material used based on thermoplastic elastomer by cooling it below a given temperature which is a function of the material used based on thermoplastic elastomer;

The given temperature is the glass transition temperature or the melting point of the thermoplastic block of the material used based on thermoplastic elastomer.

BRIEF DESCRIPTION OF THE DRAWINGS

Further particular features and advantages will emerge clearly from the description thereof that follows, which is given as a non-limiting guide, with reference to the appended drawings, in which.

DETAILED DESCRIPTION OF THE ENABLING EMBODIMENTS

Figure 1:
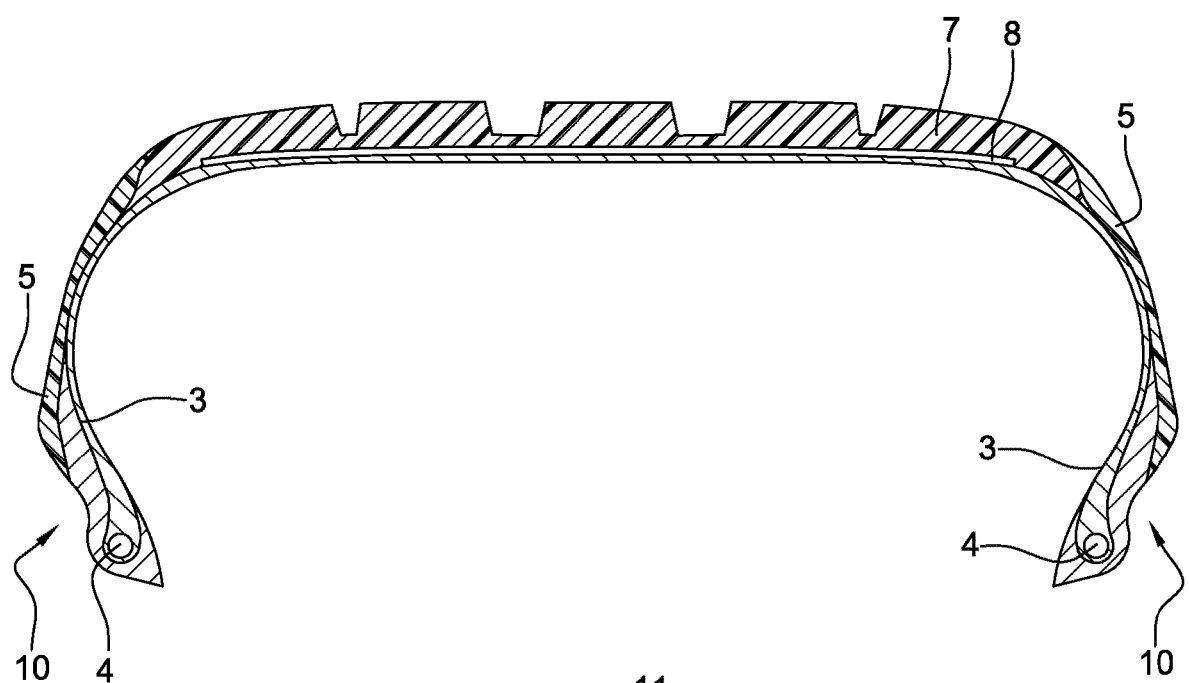
FIG. 1 is a view in partial section of a tire obtained according to a process of the disclosure.

In the various figures, identical or similar elements bear the same references, optionally with an added index. The description of their structure and their function is therefore not systematically repeated.

The term "rubbery material" means a thermosetting material such as a diene elastomer, that is to say, in a known manner, an elastomer which is derived, at least partly from (i.e. is a homopolymer or a copolymer of) diene monomers (monomers bearing two conjugated or non-conjugated carbon-carbon double bonds).

The term "tread" means an amount of material delimited by lateral surfaces and by two main surfaces, one of which, referred to as the tread surface, is intended to come into contact with a road surface when the tire is being driven on.

The term "carcass" means the air-impermeable inner rubber, the bead wires, the bead fillers, the crown butts and the carcass ply.

The term "material based on thermoplastic elastomer" means a material including entirely or partially block copolymers, constituted of rigid thermoplastic blocks, connected via supple elastomeric blocks. Such materials have mechanical behavior that is both that of an elastomer and that of a thermoplastic polymer.

Use will be made, for the definition of the thermoplastic blocks, of the characteristic of glass transition temperature (Tg) of the rigid thermoplastic block. This characteristic is well known to those skilled in the art. It makes it possible notably to choose the industrial processing (transformation) temperature. In the case of an amorphous polymer (or polymer block), the processing temperature is chosen to be substantially greater than the Tg. In the specific case of a semicrystalline polymer (or polymer block), a melting point may be observed which is then greater than the glass transition temperature. In this case, it is instead the melting point (TO which makes it possible to choose the processing temperature for the polymer (or polymer block) under consideration. Thus, hereinbelow, when reference is made to "Tg (or Tf, where appropriate)", it will be necessary to consider that it is the given temperature for the processing.

The elastomer blocks may be any elastomer known to a person skilled in the art.

As examples, which are in no way limiting, of materials based on thermoplastic elastomer, mention may be made, for example, of materials at least partly including blocks of the SIS, SBS, SEBS or SIBS type (cf. reference AM3400 V1, "Élastomères thermoplastiques [Thermoplastic elastomers] (TPE)", Michel Biron, Techniques de l'ingénieur, 10 Jul. 2000).

The disclosure applies to any type of tire, notably tires intended to equip motor vehicles of the passenger vehicle, SUV ("Sports Utility Vehicle"), two-wheel vehicle (notably motorcycle) or aircraft type, industrial vehicles chosen from vans, heavy-duty vehicles, that is to say underground trains, buses, heavy road transport vehicles (lorries, tractors, trailers), off-road vehicles, such as heavy agricultural or civil engineering vehicles, or other transportation or handling vehicles.

The disclosure relates to a process for manufacturing a tire 1 formed from materials based on thermoplastic elastomer.

According to a first embodiment, the process includes a first step a) for forming a carcass 3 from at least one first material based on thermoplastic elastomer, a second step b) for forming on the carcass 3 at least one bead zone 10 from at least one second material based on thermoplastic elastomer and then a third step c) for forming, on the assembly obtained during step b), an additional part from at least one third material based on thermoplastic elastomer so as to obtain a tire 1 which comprises a tread 7 formed during step b) or step c) from a material based on thermoplastic elastomer.

Specifically, in contrast with the usual process of manufacture on a drum in which vulcanizable rubber materials are used, in the process according to the disclosure the entire tire 1 is intended to be manufactured from materials based on thermoplastic elastomer and according to the final geometries, that is to say notably without a building step. The first embodiment may include several variants according to the elements formed during steps b) and c). Preferentially, steps a), b) and/or c) may be obtained by casting or by injection into a mold $9_1$, $9_2$, $9_3$.

Step a) may thus include a first phase a1) for manufacturing materials based on thermoplastic elastomer notably to form an air-impermeable inner rubber 6, a carcass ply 2 and two bead wires 4. Step a) may then include a second phase a2) for injecting, into a first mold $9_1$, or carcass mold 3, illustrated in cross section in FIG. 2, the first material based on thermoplastic elastomer while overmolding this first material around the carcass ply 2 and the two bead wires 4 produced during phase a1), so as to form the carcass 3. In this respect, it is understood that the rubber materials and the butyl of the impermeable rubber are replaced with one (or more) material(s) based on thermoplastic elastomer.

Figure 2:
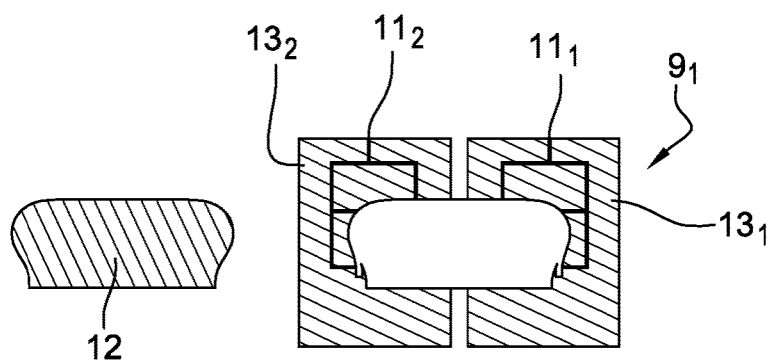
FIG. 2 is a view in cross section of a core and of a first mold used for performing a first embodiment of the process according to the disclosure.
Figure 2:
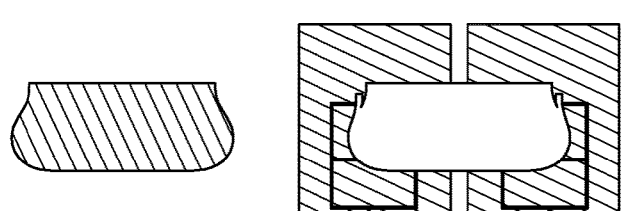
Figure 3:
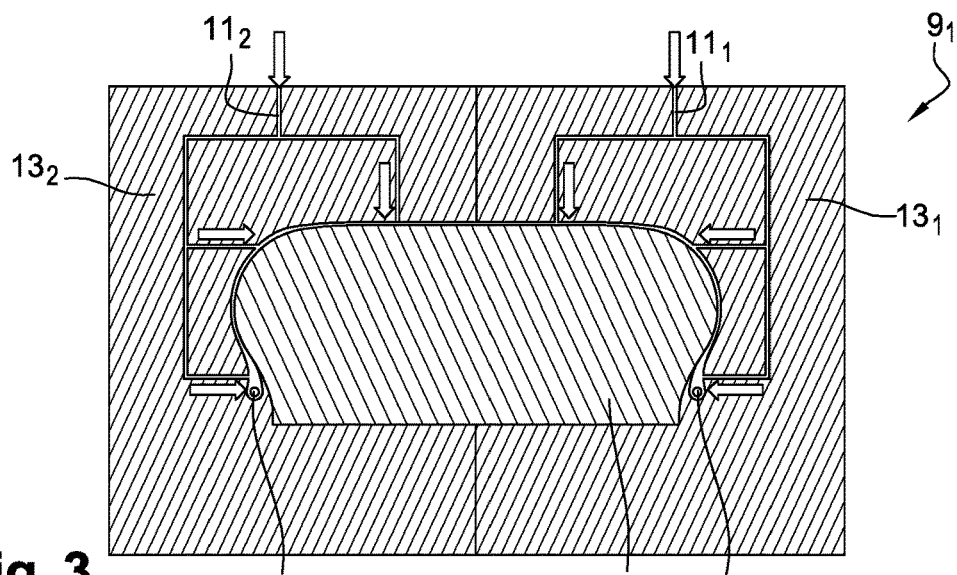
FIG. 3 is a view in partial cross section of the core mounted in the first mold before performing the first step of the first embodiment of the process according to the disclosure.

In an entirely non-limiting manner, an example of a mold $9_1$ according to the disclosure is shown in FIGS. 2 and 3. It includes a core 12 intended to form the inner geometry of the future tire 1 and two sidewalls $13_1$, $13_2$ intended to entirely cover the core 12. As is seen in FIG. 3, the sidewalls $13_1$, $13_2$ of the mold $9_1$ each include in their upper part crown pipes $11_1$, $11_2$ to feed the mold $9_1$ with material based on thermoplastic elastomer. Preferentially, during step a), the mold $9_1$ is maintained at a temperature below 35° C. and even more preferably at about 20° C.

The second phase a2) may thus include the deposition onto the core 12 of an air-impermeable material based on thermoplastic elastomer forming an inner rubber 6 followed by fitting the carcass ply 2 on this inner rubber 6. The air-impermeable material based on thermoplastic elastomer may, for example, include blocks of the SIBS type. Furthermore, the carcass ply 2 may include a composite based on glass and/or a composite based on carbon fibers and/or a woven fabric and/or a metal depending on the type of tire.

As is seen in FIG. 3, each bead wire 4, which is preferentially metallic, is moreover positioned in one of the sidewalls $13_1$, $13_2$ by means, for example, of chocks so as to maintain a substantially uniform space relative to each associated sidewall $13_1$, $13_2$. It is noted that the interstice, left between the core 12—inner rubber 6—carcass ply 2 assembly and the sidewalls $13_1$, $13_2$, then forms the desired injection space. The second phase a2) may then include the main injection of the material based on thermoplastic elastomer of the rest of the carcass 3 in order to form the latter.

The material may be injected into the crown pipes $11_1$, $11_2$ of the mold $9_1$ to fill the interstice formed between the core 12—inner rubber 6—carcass ply 2 assembly and the two sidewalls $13_1$, $13_2$. The injection (or the injections) is preferentially performed at a given processing temperature substantially higher than the glass transition temperature (or the melting point, where appropriate) of the thermoplastic block of the injected material, for instance above 200° C., and is very rapid, for instance a time of less than 10 seconds and preferentially of about 2 seconds.

Preferentially, the material(s) injected and more generally the carcass 3 obtained is maintained in the mold $9_1$ in a phase a3) so as to cool it below the glass transition temperature (or the melting point, where appropriate) of the thermoplastic block of the material based on thermoplastic elastomer for a time of less than 60 seconds by means of the heat exchange with the mold $9_1$ maintained at a temperature below 35° C. as explained above.

Thus, it is desired to ensure the cooling of at least the outer surface of the injected material(s), i.e. the surface in contact with the mold $9_1$, so as to be sufficiently rigid so as not to adhere to the mold $9_1$ and, consequently, to facilitate its release. Needless to say, depending on the type of tire (notably its thickness) and the geometry of the mold $9_1$, it may also be desired for the cooling to take place to a greater or lesser depth so that the material at the center of the carcass 3 is not deformed during the future release from the mold $9_1$.

By way of example, the injection step may thus last for about two seconds and the cooling step between 10 and 20 seconds for the formation of the carcass 3 of a passenger vehicle tire.

Finally, step a) ends with phase a4) for releasing the carcass 3 thus formed from the first mold $9_1$. It is thus understood that step a) allows the manufacture of the carcass 3, i.e. the inner rubber 6, the bead wires 4, the bead fillers, the crown butts and the carcass ply 2 at the same time rather than in a plurality of steps flat on a drum as for the current tires based on rubber materials. The bonding between the elements of the carcass 3 is promoted by the pressures reached during the injection, preferentially greater than 1000 bar, and the good wettability of the material based on thermoplastic elastomer, which, by virtue of the injection temperature, is in its liquid phase.

According to a first variant of the first embodiment, step b) may include a first phase b1) for manufacturing at least one reinforcing ply 8. Step b) may then include a second phase b2) for injecting, into a second mold $9_2$, or bead zone mold 10, as illustrated in FIG. 4, the second material based on thermoplastic elastomer while overmolding this second material on the reinforcing ply 8 so as to form the bead zones 10 and a tread 7 on the carcass 3.

Figure 4:
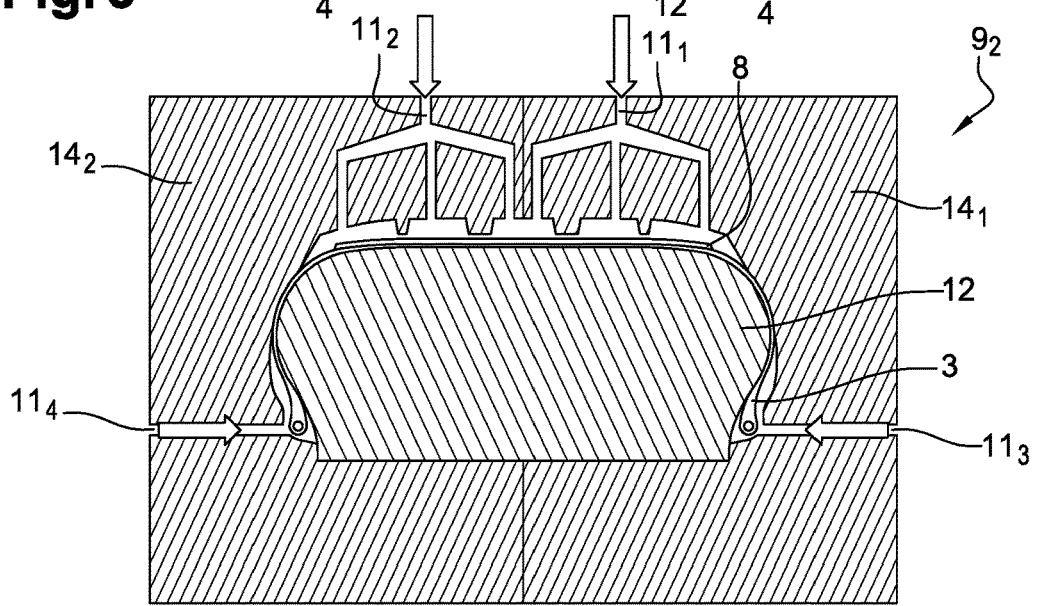
FIG. 4 is a view in partial cross section of the core mounted in a second mold before performing the second step according to a variant of the first embodiment of the process according to the disclosure.

In an entirely non-limiting manner, an example of a mold $9_2$ according to the disclosure is shown in FIG. 4. It includes the core 12 coated with the carcass 3 formed in step a) and two sidewalls $14_1$, $14_2$ covering the core 12 and bearing on the carcass 3 between the future bead zones 10 and the future tread 7. As is seen in FIG. 4, the sidewalls $14_1$, $14_2$ of the mold $9_2$ each include in their upper part crown pipes $11_1$, $11_2$ and laterally peripheral pipes $11_3$, $11_4$ to feed the mold $9_2$ with materials based on thermoplastic elastomer.

More particularly, during phase b2), one material based on thermoplastic elastomer is injected to form the bead zones 10 and another material based on thermoplastic elastomer is injected to form the tread 7 so as to optimize their respective functions, i.e. the materials based on thermoplastic elastomer may be different and dedicated to their functions. More precisely, the material of the bead zones 10 must be suited to the mounting/removal of the tire 1 on the wheel, or rim (not shown), but also to the torque passage of the engine. The material of the tread 7 must allow it to be optimized in terms of its contact with the ground notably as regards its dry and wet grip, its wear and its energy (noise and consumption). However, there is nothing to prevent the same material based on thermoplastic elastomer from being used for the bead zones 10 and the tread 7.

Preferentially, the material of the bead zones 10 is thus injected via the peripheral pipes 11₃, 11₄ of the mold 9₂, whereas the material of the tread 7 is injected via the crown pipes 11₁, 11₂ of the mold 9₂ which are branched to fill the interstice formed between the carcass 3 and the crown of the mold 9₂ at several apertures emerging facing the carcass 3. Advantageously, according to the disclosure, since the two sidewalls 14₁, 14₂ bear on the carcass 3 between the future bead zones 10 and the future tread 7, each injected material is isolated in its dedicated interstice of the mold 9₂ and cannot mix with another.

Preferentially, during step b), the mold 9₂ is maintained at a temperature below 35° C. and even more preferably at about 20° C.

The second phase b2) may thus include fitting on the upper surface of the carcass 3 of the reinforcing ply 8. The reinforcing ply 8 may include working crown plies and a hoop, and may be formed from a composite based on glass and/or a composite based on carbon fibers and/or a woven fabric and/or a metal depending on the type of tire.

It is noted that the interstice, left between the carcass 3 and the sidewalls 14₁, 14₂, then forms three distinct spaces. The second phase b2) may then include the actual injections of the materials based on thermoplastic elastomer on the carcass 3.

The materials may thus be injected into the crown pipes 11₁, 11₂ and the peripheral pipes 11₃, 11₄ of the mold 9₂ to fill the three distinct spaces. Each injection is preferentially performed at a processing temperature chosen to be substantially higher than the glass transition temperature (or the melting point, where appropriate) of the thermoplastic block of the injected material, for instance above 200° C., and is very rapid, for instance a time of less than 10 seconds and preferentially of about 2 seconds.

Preferentially, the material(s) injected is maintained in the mold 9₂ in a phase b3) so as to cool it below the glass transition temperature (or the melting point, where appropriate) of the thermoplastic block of the material based on thermoplastic elastomer for a time of less than 60 seconds by means of the heat exchange with the mold 9₂ maintained at a temperature below 35° C. as explained above.

Thus, it is desired to ensure the cooling of at least the outer surface of the injected material(s), i.e. the surface in contact with the mold 9₂, so as to be sufficiently rigid so as not to adhere to the mold 9₂ and, consequently, to facilitate its release. Needless to say, depending on the type of tire (notably its thickness) and the geometry of the mold 9₂, it may also be desired for the cooling to take place to a greater or lesser depth so that the material at the center of the bead zones 10 and of the tread 7 is not deformed during the future release from the mold 9₂.

By way of example, the injection step may thus last for about two seconds and the cooling step between 30 and 40 seconds for the formation of the bead zones 10 and of the tread 7 of a passenger vehicle tire.

Finally, step b) ends with phase b4) for releasing the assembly obtained during step b2) from the second mold 9₂. It is thus understood that step b) allows the secure fastening of the bead zones 10 and of the tread 7 onto the carcass 3, i.e. with the reinforcing ply 8, the tread 7 and the mounting/removal protections at the same time, and not with a building step followed by a plurality of steps on a drum as with the current tires based on rubber materials.

Figure 5:
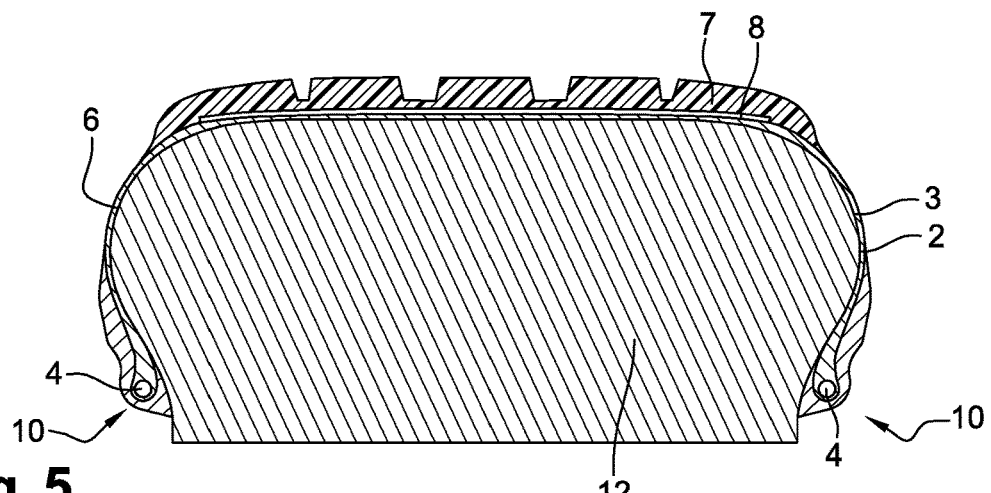
FIG. 5 is a view in partial cross section of the assembly obtained after performing the second step according to the variant of the first embodiment of the process according to the disclosure.

An example of a product obtained according to step b) is illustrated in FIG. 5. The bonding to the carcass 3 is promoted by the pressures reached during the injection, preferentially greater than 1000 bar, and the good wettability of the materials based on thermoplastic elastomer, which, by virtue of the injection temperature, are in their liquid phase.

According to the first variant of the first embodiment, step c) may include a first phase c1) for injecting, into a third mold 9₃, or additional part mold, the third material based on thermoplastic elastomer so as to form exterior sidewalls 5.

Figure 6:
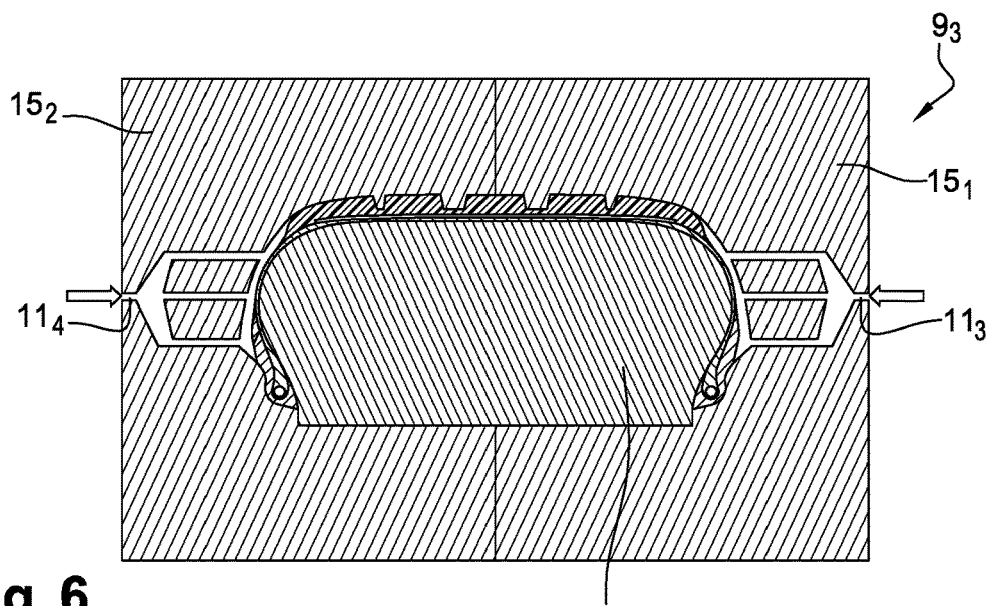
FIG. 6 is a view in partial cross section of the core mounted in a third mold before performing the third step according to the variant of the first embodiment of the process according to the disclosure.
Figure 7:
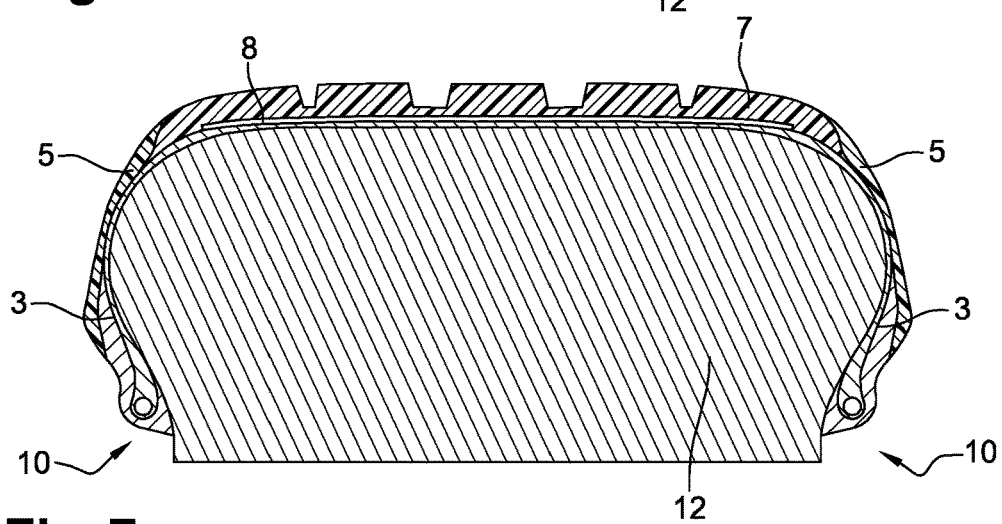
FIG. 7 is a view in partial cross section of the assembly obtained after performing the third step of the variant of the first embodiment of the process according to the disclosure.

In an entirely non-limiting manner, an example of a mold 9₃ according to the disclosure is shown in FIG. 6. It includes the core 12 coated with the carcass 3—tread 7—bead zones 10 assembly formed in step b) and two sidewalls 15₁, 15₂ covering the core 12 and bearing on the assembly formed in step b) between the future exterior sidewalls 5. As is seen in FIG. 6, the sidewalls 15₁, 15₂ of the mold 9₃ each laterally include peripheral pipes 11₃, 11₄ to feed the mold 9₃ with material based on thermoplastic elastomer.

More particularly, during phase c1), a material based on thermoplastic elastomer is injected to form the exterior sidewalls 5. More precisely, the material must display an advantageous aesthetic appearance to receive the regulatory markings and must be very resistant to mechanical and chemical attack (scratching, ozone, oxidation, etc.).

Preferentially, the material of the exterior sidewalls 5 is thus injected via the peripheral pipes 11₃, 11₄ of the mold 9₃ which are branched to fill the interstice formed between the assembly formed in step b) and the mold 9₃ at several apertures emerging facing the assembly formed in step b). Advantageously, according to the disclosure, since the two sidewalls 15₁, 15₂ bear on the assembly formed in step b) between the tread 7 and the bead zones 10, each injected material is isolated in its dedicated interstice of the mold 9₃ and cannot mix with the other. It is noted that the interstice, left between the assembly formed in step b) and the sidewalls 15₁, 15₂ forms two distinct spaces.

Preferentially, during step c), the mold 9₃ is maintained at a temperature below 35° C. and even more preferably at about 20° C. The materials may thus be injected into the peripheral pipes 11₃, 11₄ of the mold 9₃ to fill the two distinct spaces. Each injection is preferentially performed at a processing temperature chosen to be substantially higher than the glass transition temperature (or the melting point, where appropriate) of the thermoplastic block of the injected material, for instance above 200° C., and is very rapid, for instance a time of less than 10 seconds and preferentially of about 2 seconds. Preferentially, the same material based on thermoplastic elastomer is used for each exterior sidewall 5. However, there is nothing to prevent different materials based on thermoplastic elastomer from being used for each exterior sidewall 5.

Preferentially, the material(s) injected is maintained in the mold 9₃ in a phase c2) so as to cool it below the glass transition temperature (or the melting point, where appropriate) of the thermoplastic block of the material based on thermoplastic elastomer for a time of less than 60 seconds by means of the heat exchange with the mold 9₃ maintained at a temperature below 35° C. as explained above.

Thus, it is desired to ensure the cooling of at least the outer surface of the injected material(s), i.e. the surface in contact with the mold 9₃, so as to be sufficiently rigid so as not to adhere to the mold 9₃ and, consequently, to facilitate its release. Needless to say, depending on the type of tire (notably its thickness) and the geometry of the mold 9₃, it may also be desired for the cooling to take place to a greater or lesser depth so that the material at the centre of the exterior sidewalls 5 is not deformed during the future release from the mold $9_3$.

By way of example, the injection step may thus last for about two seconds and the cooling step between 10 and 20 seconds for the formation of the exterior sidewalls 5 of a passenger vehicle tire.

Finally, step c) ends with phase c3) for releasing the tire 1 thus formed from the third mold $9_3$. It is thus understood that step c) allows the manufacture of the exterior sidewalls 5 at the same time and not in several steps on a building drum as with the current tires based on rubber materials.

An example of a product obtained according to step c) is illustrated in FIGS. 1 to 7. The bonding of the various elements of the tire 1 is promoted by the pressures reached during the injection, preferentially greater than 1000 bar, and the good wettability of the materials based on thermoplastic elastomer, which, by virtue of the injection temperature, are in their liquid phases.

Advantageously according to the disclosure, the process involves novel types of materials based on one (or more) thermoplastic elastomer(s) (TPE). It is thus understood that these materials used in the manufacture of the tire 1 replace conventional rubber materials. According to the disclosure, the replacement advantageously concerns all of the tire 1.

The use of these materials based on thermoplastic elastomer makes it possible, in point of fact, to significantly modify the production costs of the tire 1 and also its final performance qualities. By way of example, the rolling resistance, the resistance to external attack (scratching, ozone, oxidation, etc.) may be notably improved when compared with rubber materials. In addition, they are recyclable.

Finally, it is no longer necessary to perform a final curing step, notably to perform vulcanization, which generally lasts between 10 and 15 minutes for a passenger vehicle tire. It is thus understood that the process is very much shortened when compared with the manufacturing process based on rubber materials based on diene elastomers.

As explained above, the first embodiment may include several variants according to the elements formed during steps b) and c). It is understood, in point of fact, that the first embodiment may not be limited to the first variant, but may include other variants depending on the sequence of manufacture of the bead zones 10, of the tread 7 and of the exterior sidewalls 5.

In an entirely non-limiting manner, according to a second variant not shown, step a) is preferentially identical to that of the first variant. Step b) might, on the other hand, include the phases b5) for injecting, into a second mold $9_2$, or bead zone mold 10, the second material based on thermoplastic elastomer so as to form solely the bead zone 10 on the carcass 3, b6) for cooling the assembly obtained during step b5) in the second mold $9_2$ and then b7) for releasing the assembly obtained during step b5) from the second mold $9_2$. The second variant might include step c) according to the phases c4) for manufacturing at least one reinforcing ply 8, c5) for injecting, into a third mold $9_3$, or additional part mold, the third material based on thermoplastic elastomer while overmolding this third material on the reinforcing ply 8 so as to form exterior sidewalls 5 and a tread 7, c6) for cooling the assembly obtained during step c5) in the second mold $9_3$ and c7) for releasing the tire 1 thus formed from the third mold $9_3$ according to technical effects and advantages that are identical or similar to the first variant of the first embodiment.

In this second variant not shown, during phase c5), one material based on thermoplastic elastomer could be injected to form the exterior sidewalls 5 and another material based on thermoplastic elastomer to form the tread 7 so as to optimize their respective functions, i.e. the two materials based on thermoplastic elastomer would be different and dedicated to their functions. More precisely, the two types of materials would be injected into a single interstice formed between the carcass 3—bead zones 10 assembly and the mold $9_3$ so that the material fronts join between the bead zones 10 and the future tread 7 as they come, respectively, from crown pipes $11_1$, $11_2$ and peripheral pipes $11_3$, $11_4$.

According to another example, in a third variant not shown, step a) is preferentially identical to that of the first and second variants. Step b) might, on the other hand, include the phases b8) for injecting, into a second mold $9_2$, or bead zone mold 10, the second material based on thermoplastic elastomer so as to form bead zones 10 and exterior sidewalls 5 on the carcass 3, b9) for cooling the assembly obtained during step b8) in the second mold $9_2$ and then b10) for releasing the assembly obtained during step b8) from the second mold $9_2$. The third variant might include step c) according to the phases c4) for manufacturing at least one reinforcing ply 8, c8) for injecting, into a third mold $9_3$, or additional part mold, the third material based on thermoplastic elastomer while overmolding this third material on the reinforcing ply 8 so as to form a tread 7, c9) for cooling the assembly obtained during step c8) in the second mold $9_2$ and then c10) for releasing the tire 1 thus formed from the third mold $9_3$ according to technical effects and advantages that are identical or similar to the first and second variants of the first embodiment.

The disclosure is not limited to the embodiments and variants presented and other embodiments and variants will be clearly apparent to a person skilled in the art. It should not be excluded that at least two or more of the steps a), b) or c) could be combined via differentiated injections and a mold with an interior space that is modifiable without having to open the mold, for instance a drawer mold.

Another variant not shown may also be envisaged, in which the inner rubber 6, the bead filler and the crown butts are injected on the core 12. Next, the carcass ply 2 and the bead wires 4 are fitted on the assembly formed in order subsequently to inject the protector and the exterior sidewalls 5. Finally, this variant might include fitting of the reinforcing ply 8 in order subsequently to inject the tread 7 according to technical effects and advantages that are identical or similar to the other three variants of the first embodiment.

It is also understood that the materials based on thermoplastic elastomer may be identical or different. Thus, each step a), b) and c) may use one (or more) material(s) that are identical to or different from the other steps and each step a), b) and c) may use one (or more) material(s) that are identical or different, i.e. in the same step a), b) or c), forming at least one element of the tire 1 with one (or more) identical or different material(s).

It is also possible to not use three molds $9_1$, $9_2$, $9_3$ that are entirely different to perform steps a), b) and c). Thus, in a second embodiment illustrated by way of example in FIGS. 8 to 11, the three molds $9_1$, $9_2$, $9_3$ may be formed from a frame 16 arranged to receive removable elements 17 dedicated to each step a), b) and c).

Figure 8:
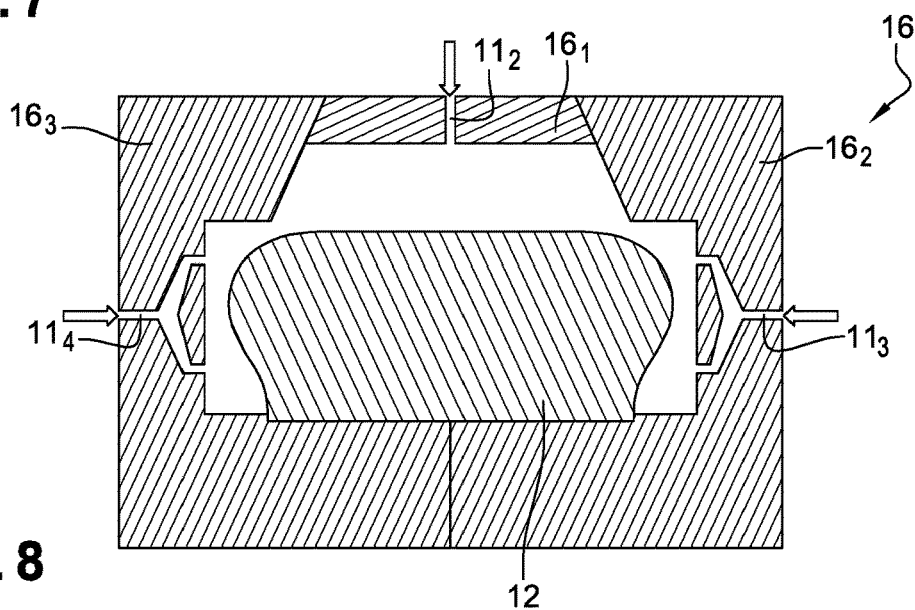
FIG. 8 is a view in cross section of a core and of a frame used for performing a second embodiment of the process according to the disclosure.
Figure 9:
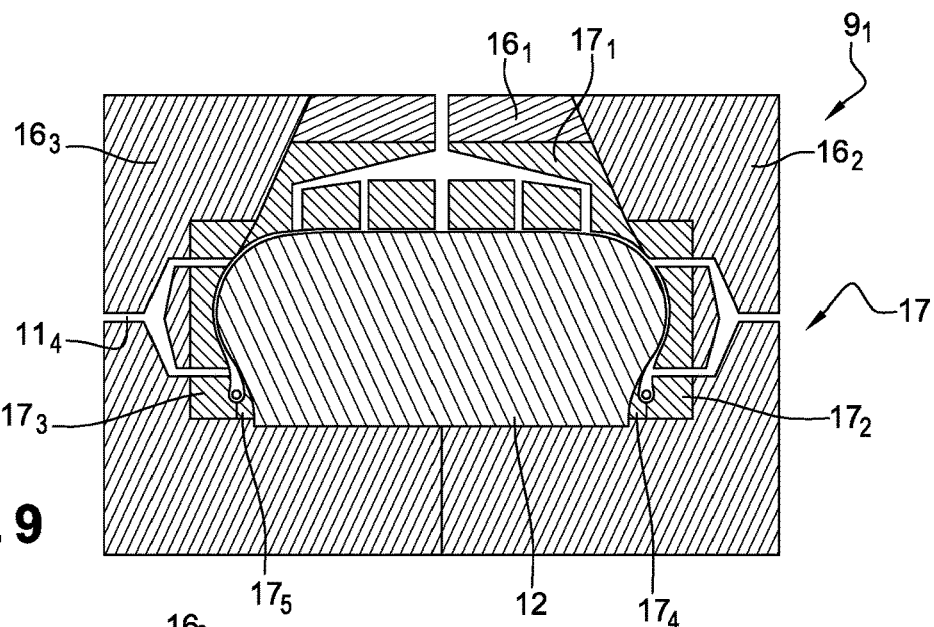
FIG. 9 is a view in partial cross section of the core mounted in the frame with a first set of drawers before performing the first step of the second embodiment of the process according to the disclosure.

As illustrated in FIGS. 8 and 9, the frame 16 may thus include a frame crown $16_1$ and frame sidewalls $16_2$, $16_3$ forming a substantially annular inner space for receiving the core 12 and the removable elements 17. The frame crown $16_1$ includes crown pipes $11_2$ and the frame sidewalls $16_2$, $16_3$ comprise peripheral pipes $11_3$, $11_4$ to feed the mold $9_1$, $9_2$, $9_3$ with materials based on thermoplastic elastomer in each step.

Figure 10:
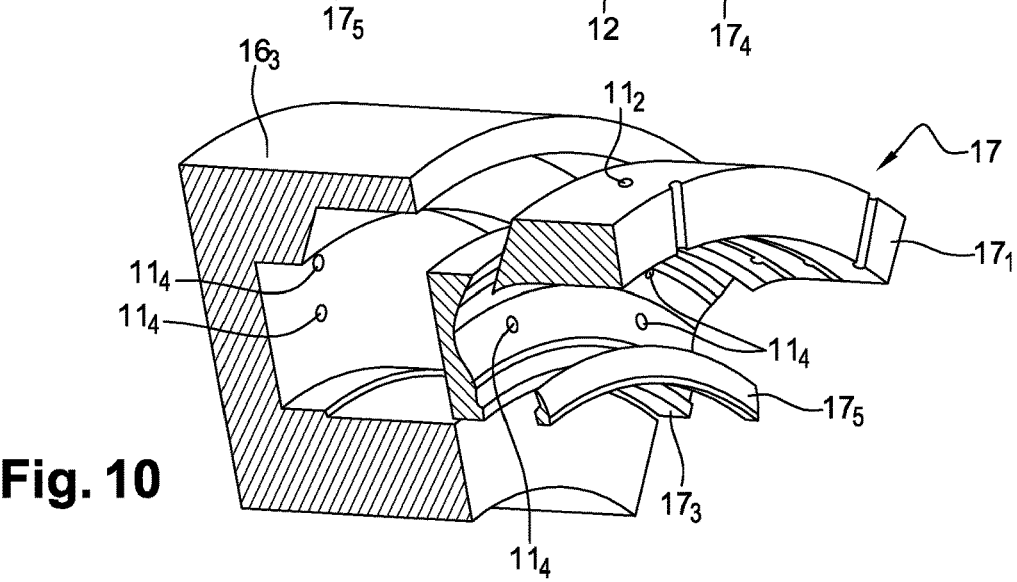
FIG. 10 is an exploded perspective view of a part of the frame and of a part of the first set of drawers for performing the first step of the second embodiment of the process according to the disclosure.

An example of removable elements 17 is illustrated in perspective in FIG. 10. By way of example, the mold $9_1$ might thus include a crown drawer $17_1$, sidewall drawers $17_2$, $17_3$ and core drawers $17_4$, $17_5$. The removable elements 17 may thus be changed between steps a), b) and c) and obtain technical effects and advantages that are identical or similar to the first embodiment and according to the four variants cited with advantages identical or similar to the first embodiment. It may notably be understood that the crown pipes $11_2$ and the peripheral pipes $11_3$, $11_4$ then extend in the removable elements 17 as illustrated in FIG. 10.

Figure 11:
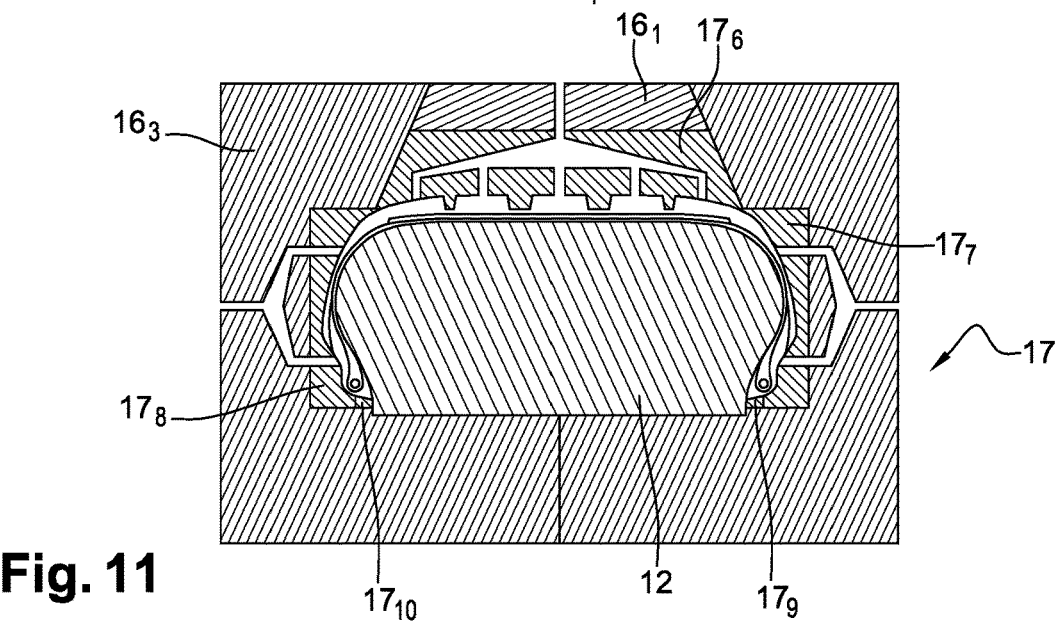
FIG. 11 is a view in partial cross section of the core mounted in the frame with a final set of drawers before performing the third step according to a variant of the second embodiment of the process according to the disclosure.

In order to show the frame 16 with a second configuration of the second embodiment, an example of the third mold $9_3$ is illustrated in FIG. 11. The frame 16 may thus include another crown drawer $17_6$, other sidewall drawers $17_7$, $17_8$ and other core drawers $17_9$, $17_{10}$.

What is claimed is:

1. A process for manufacturing a tire, comprising the following steps:
    a) forming a carcass from at least one first material based on a thermoplastic elastomer;
    b) forming on the carcass at least one bead zone from at least one second material based on a thermoplastic elastomer; and
    c) forming, on the assembly obtained during step b), an additional part from at least one third material based on a thermoplastic elastomer;
    steps a), b), and c) forming a tire which comprises a tread formed during step b) from the at least one second material based on the thermoplastic elastomer; and
    wherein step b) includes the following phases;
    b1) manufacturing at least one reinforcing ply,
    b2) injecting, into a bead zone mold, the second material based on the thermoplastic elastomer while overmolding this second material on the at least one reinforcing ply so as to form the at least one bead zone and the tread on the carcass,
    b3) cooling, in the bead zone mold, the assembly obtained during step b2), and
    b4) releasing the assembly obtained during step b2) from the bead zone mold.

2. The process according to claim 1, in which step a) includes the following phases:
    a1) manufacturing a carcass ply and two bead wires;
    a2) injecting, into a carcass mold, the first material based on the thermoplastic elastomer while overmolding this first material around the carcass ply and the two bead wires so as to form the carcass;
    a3) cooling, in the carcass mold, the assembly obtained during step a2); and
    a4) releasing the carcass thus formed from the carcass mold.

3. The process according to claim 2, in which the mold is maintained at a temperature below 35° C. during the process.

4. The process according to claim 2, in which the cooling phase allows a rigidification of at least an outer surface of the material used based on the thermoplastic elastomer by cooling it below a given temperature which is a function of the material used based on the thermoplastic elastomer.

5. The process according to claim 4, in which the given temperature is a glass transition temperature or a melting point of the at least one first material used based on the thermoplastic elastomer.

6. The process according to claim 1, in which step c) includes the following phases:
    c1) injecting, into an additional part mold, the third material based on the thermoplastic elastomer so as to form exterior sidewalls;
    c2) cooling, in the additional part mold, the assembly obtained during step c1); and
    c3) releasing the tire (1) thus formed from the additional part mold.

7. The process according to claim 6, in which the cooling phase allows a rigidification of at least an outer surface of the at least one third material used based on the thermoplastic elastomer by cooling it below a given temperature which is a function of the material used based on the thermoplastic elastomer.

8. The process according to claim 1, in which the cooling phase allows a rigidification of at least an outer surface of the at least one second material used based on the thermoplastic elastomer by cooling it below a given temperature which is a function of the material used based on the thermoplastic elastomer.

* * * * *